Patented July 14, 1931

1,814,086

UNITED STATES PATENT OFFICE

JOSEPH F. HAGGERTY AND DEAN D. CRANDELL, OF BUFFALO, NEW YORK, ASSIGNORS TO NATIONAL GYPSUM COMPANY, OF BUFFALO, NEW YORK, A CORPORATION OF DELAWARE

PLASTIC PAINT

No Drawing. Application filed August 10, 1928. Serial No. 298,874.

This invention relates to plastic paints and in general to plastic decorative materials for use in covering plaster walls and ceilings, plaster board surfaces and other surfaces, to impart thereto a texture finish.

Plastic paints now in use for a variety of purposes generally consist of an adhesive plastic base such as casein to which is added a variety of special ingredients such as powdered mica, all with a view to providing a plastic covering composition which may be applied in a thin layer to walls and ceilings and thereafter treated so as to present a texture finish. The desired textures are obtained by utilizing tools employed in every day use such as the whisk broom, stippling brush, sponge or crumpled paper. The coated surface is ordinarily sized and tinted, a great variety of effects being obtained.

It is an object of the present invention to provide a plastic paint possessing all of the necessary characteristics of such a product but which can be produced at a cost far below the cost of plastic paints now in the market. It is also an object of this invention to provide a plastic paint which is easier to handle than the products heretofore employed and which presents a more pleasing appearance when applied to any surface.

In general this invention makes it possible to avoid entirely the necessity of employing expensive ingredients such as the casein base heretofore commonly employed and the powdered mica or other similar material. We have found that a plastic paint of superior qualities can be produced by using ordinary white molding plaster or calcined gypsum and a small percentage of very finely divided fibrous material in pulp form. While any finely divided fiber pulp may be employed, we prefer to use such pulp obtained by grinding wood fiber or paper so as to produce a light fluffy mass of pulp. This pulp may be gradually added to calcined gypsum until the percentage of pulp is in the neighborhood of from 1 to 8 per cent by weight of the calcined gypsum and preferably about 4½ per cent of the calcined gypsum.

A plastic paint suitable for the many purposes for which such material is now generally used must be capable of presenting what has been referred to as the third dimension aspect or appearance when subjected to the action of a stippling brush, sponge or the like. In other words the paint must have sufficient body and adhesive qualities to enable the tool to draw out minute projections of the plastic material so as to cause the plastic coating to present a rough or stippled appearance. We have found that the use of a small percentage of fiber pulp as above described imparts to the gypsum the capacity to develop an unusually pleasing appearance when subjected to the action of the tools ordinarily employed in this art. The fiber pulp adds greatly to the body of the plastic material and causes the minute projections of the material to retain their shape until the gypsum has set. Furthermore, the fiber pulp is capable of retaining a relatively large quantity of water and, as a consequence, the plastic material has excellent spreading qualities and produces a coating of high insulating value. This invention makes it possible to provide a coating which is very durable, the superior strength and durability of the coating being perhaps due to the bond formed between the set gypsum and the individual particles or fibers of the fiber pulp.

We have found it desirable to incorporate a small quantity of a carbohydrate such as dextrine or starch with the fiber pulp and calcined gypsum, the percentage of carbohydrate being not in excess of 10 or 15 per cent and preferably in the neighborhood of 4½ per cent by weight of the calcined gypsum. The carbohydrate has a tendency to come to the surface of the plastic coating to thereby form a seal which prevents excessive absorption of size or other material subsequently applied to the surface of the plastic paint. Furthermore the carbohydrate renders the fiber pulp capable of absorbing more water than it otherwise would absorb, and otherwise beneficially affects the action of the fiber pulp in the composition. The fiber pulp holds enough water so that the base to which the plastic paint is applied does not rob the gypsum of the water required for proper crystallization.

The use of a small percentage of dextrine or other carbohydrate increases the plasticity of the paint and makes it easier to handle with the trowel. The carbohydrate also hardens the surface of the plastic paint coating in addition to rendering the surface of the coating impervious to moisture.

It is desirable to add enough retarder to give the required set. The fiber pulp acts as a retarder to some extent due to the water absorbed by the pulp but we have found that it is ofttimes desirable to add a commercial retarder. We may add a small quantity of glue, ordinarily not more than 1 per cent and preferably not more than 0.4 of 1 per cent by weight of the calcined gypsum. The glue acts as a retarder and strengthens the bond between the plastic paint and the surface to which it is applied.

It is to be understood that the separate ingredients above mentioned may be prepared in accordance with commercial practice and that they may be combined by any suitable mixing apparatus so as to form a dry mixture. In order to use the improved mixture it is merely necessary to add water until the desired degree of plasticity has been obtained whereupon the wet mixture may be applied to the surface to be coated. It is not necessary to apply the paint in a layer having a thickness more than approximately $\frac{1}{16}$ of an inch and, accordingly a small quantity of the plastic paint will cover a very large surface. After the plastic paint has set and dried out a suitable size may be applied and the surface may be tinted in accordance with the usual practice.

The texture finish made by utilizing the present invention is more pleasing in appearance than the texture finishes heretofore produced, the tinted surface has a soft appearance and in general the invention makes it possible to produce the customary antique finishes in a most attractive form. The improved plastic paint takes the color or tint more evenly than the plastic paints heretofore employed and the improved product can be produced at a cost of less than $\frac{1}{10}$ the cost of the plastic paints now in general use.

We claim:—

1. A dry plastic paint base comprising a mixture of calcined gypsum and water absorbent fibre pulp in the proportions of one to eight parts fibre pulp to one hundred parts calcined gypsum the mixture being adapted upon adding water to be applied as a coating and textured by the action of a stippling brush, sponge or the like.

2. A dry plastic paint base comprising a mixture of calcined gypsum and water absorbent fibre pulp in the proportions of approximately four and one-half parts fibre pulp to one hundred parts calcined gypsum the mixture being adapted upon adding water to be applied as a coating and textured by the application of a stippling brush, sponge or the like.

3. A dry plastic paint base comprising calcined gypsum, water absorbent fibre pulp, carbohydrate and glue in the proportions of approximately four and one-half parts fibre pulp, four and one-half parts carbohydrate and four tenths parts glue to one hundred parts calcined gypsum, the mixture being adapted upon adding water to be applied as a coating and textured by the action of a stippling brush, sponge or the like.

In testimony whereof we affix our signatures.

DEAN D. CRANDELL.
JOSEPH F. HAGGERTY.